J. E. McBRIDE.
TROLLEY.
APPLICATION FILED DEC. 27, 1919.
1,372,761.
Patented Mar. 29, 1921.
2 SHEETS—SHEET 1.
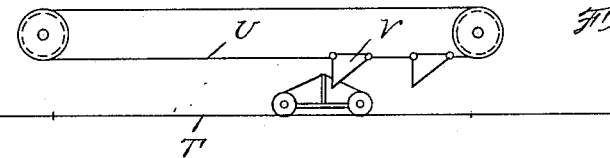
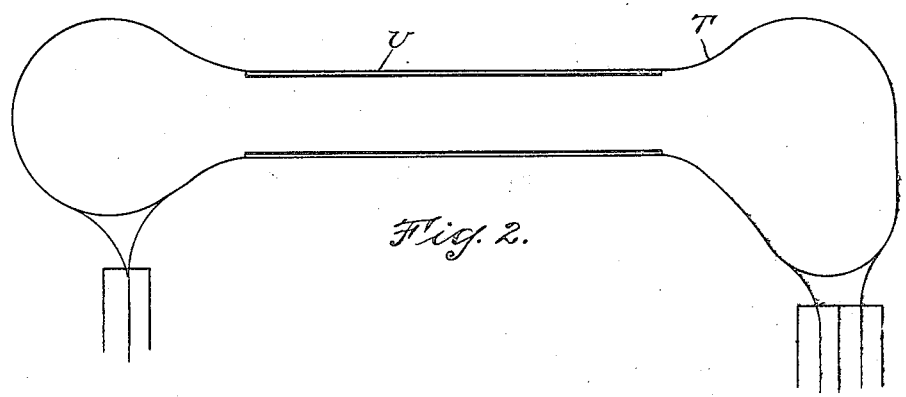
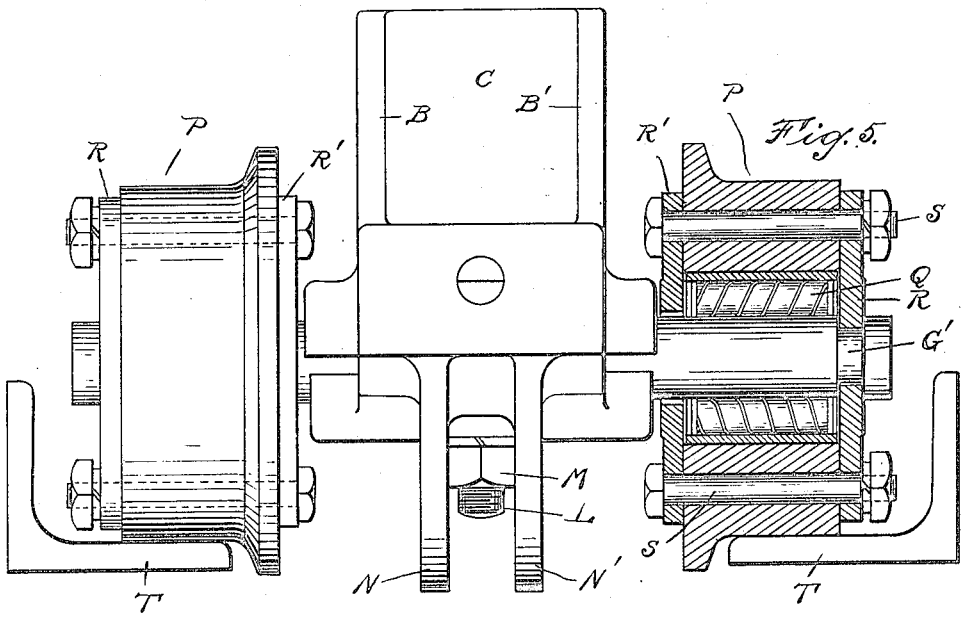
Inventor
Jesse E. McBride
By Whittemore Hulbert & Whittemore
Attorneys J. E. McBRIDE.
TROLLEY.
APPLICATION FILED DEC. 27, 1919.
1,372,761.
Patented Mar. 29, 1921.
2 SHEETS—SHEET 2.
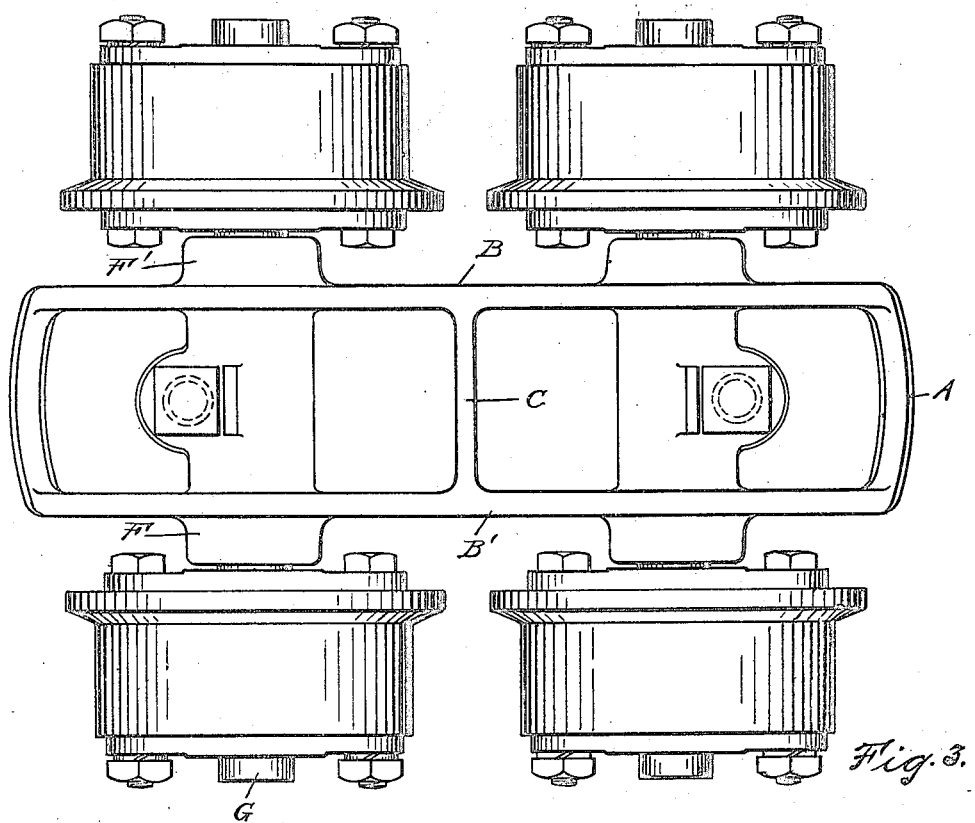
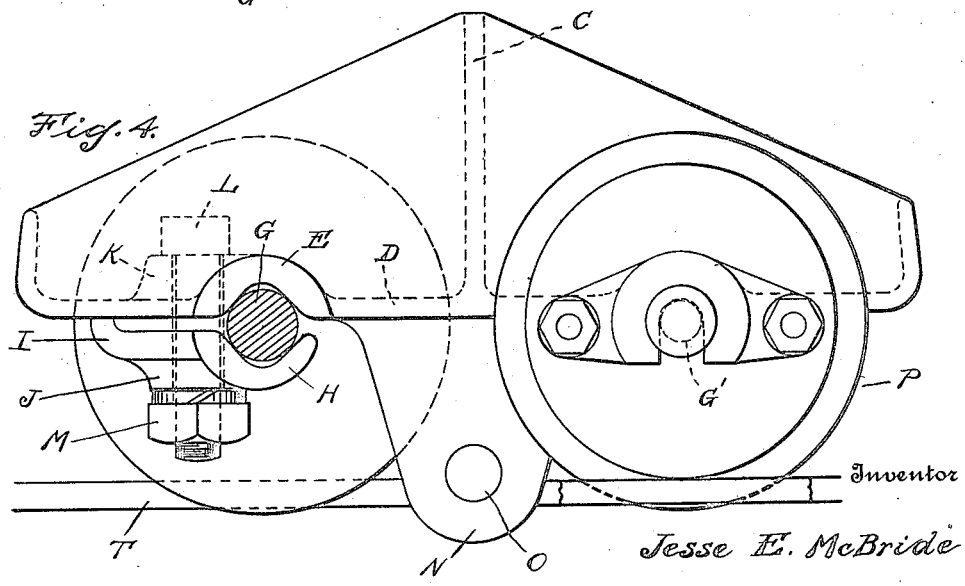
Inventor
Jesse E. McBride
By Whittemore Hulbert & Whittemore
Attorneys

UNITED STATES PATENT OFFICE.

JESSE E. McBRIDE, OF DETROIT, MICHIGAN, ASSIGNOR TO PALMER-BEE COMPANY, OF DETROIT, MICHIGAN, A CORPORATION OF MICHIGAN.

TROLLEY.

1,372,761.      Specification of Letters Patent.      Patented Mar. 29, 1921.

Application filed December 27, 1919. Serial No. 347,788.

*To all whom it may concern:*

Be it known that I, JESSE E. McBRIDE, a citizen of the United States of America, residing at Detroit, in the county of Wayne and State of Michigan, have invented certain new and useful Improvements in Trolleys, of which the following is a specification, reference being had therein to the accompanying drawings.

The invention relates to trolleys designed for use in connection with conveyers, and it is the object of the invention to obtain a construction which can be driven by power over certain portions of the track and may be manually operated over other portions. To this end the invention comprises the novel construction as hereinafter set forth.

In the drawings:

Figure 1 is a diagrammatic side elevation showing the trolley engaged with the track and in connection with the power propelling device;

Fig. 2 is a diagrammatic plan view of the track;

Fig. 3 is a plan view of the trolley;

Fig. 4 is a vertical longitudinal section partly in elevation;

Fig. 5 is a cross-section partly in elevation.

In the installation of trolley conveyers it is frequently desirable to provide for the manual manipulation of the same on certain portions of the track, while on other portions it would be convenient to provide a power drive. It is, however, necessary with such a construction to provide for the ready engagement and disengagement of the trolley from the power propelling means. This I have accomplished by a trolley construction as follows: A is a frame comprising parallel side plates B and B', which are of greatest height at the center and taper toward the opposite ends. C is a cross web connecting the central portions of the side plates, and D is a bottom web extending between the sides B and B' and which is provided on opposite sides of the center with the transversely-extending bearing portions E, said portions extending outward beyond the side plates, as indicated at F and F'. The bearings E are of a substantially inverted V cross-section and are adapted to form one member of a clamp for securing an axle G. The coöperating member of this clamp is formed by a plate H having a similar V-shaped groove therein with a heel plate I extending laterally therefrom. There is also provided an apertured boss J which registers with a similar apertured boss K on the web D, while a bolt L and nut M engaging the apertured bosses serve to effect the clamping. The frame A is further provided with the depending lugs N and N' apertured at O and serving as a securing means for the hoist. P are the trolley wheels which are journaled upon the projecting outer ends of the axle G, being provided with the roller bearings Q which are retained by plates R and R' on opposite sides of the wheels. The plate R is apertured for the passage of the axle, while the plate R' is slotted to engage a groove G' near the end of the axle G, thereby forming a retainer for preventing endwise displacement. The plates R and R' are secured by bolts S passing through the wheels on diametrically opposite sides thereof.

The construction described is one which requires scarcely any machining and in which the parts are quickly and easily assembled. Thus, the axles may be formed of rolled stock, the only machining being the cutting of the grooves G' adjacent the ends thereof. The clamping bearings G and H are unmachined castings and by reason of the heel plates I, which form fulcrum bearings, the clamping bolts L will securely clamp the bolts H.

In use, the trolley is mounted upon a track T and over certain portions of this track, which extend in a straight line, there are arranged propelling chains U having a series of latch dogs V attached thereto. These dogs are adapted to enter between the side plates B and B' and to engage the cross web C, thereby pushing the trolley along the track, while at the same time the trolley is free to pass out of engagement with said dogs at the end of the propelling chain. Thus, the construction may be used in many places where a continuously driven conveyer would be inapplicable.

What I claim as my invention is:

1. A trolley, comprising a frame having spaced side bars, and a web cross-connected to said side bars forming a reinforcement therefor and an abutment for engagement of a driver.

2. In a trolley, a frame having spaced side bars of greatest height at the center and tapering toward the ends thereof, and a cross web connecting the central portion of said side plates forming a reinforcement therefor, and an abutment for the engagement of a driver.

3. In a trolley, a frame comprising spaced side bars, a connecting bottom web and a vertical transverse web, axles clamped to said bottom web on opposite sides of said transverse web, and a load-sustaining lug depending from said bottom web beneath said transverse web.

4. In a trolley, a frame comprising spaced side plates and a connecting bottom web having half-bars formed therein on opposite sides of the center thereof and transversely-extending axle shafts for engaging said half-bars, clamping plates for securing said shafts in said bearings provided with heel plates, and a bolt for securing said clamping plate to said bottom web and thereby clamping said axle.

5. In a trolley, a frame comprising spaced side plates connected by a vertical central web and a horizontal bottom web, said bottom web being provided with V-shaped transversely extending bearings on opposite sides of the center of the frame, axles for engaging said V-shaped bearing, a clamping plate for securing each axle, being provided with a V-shaped bearing portion and a laterally extending heel plate, and a bolt passing through said clamping plate and the registering aperture in said horizontal web intermediate said axle, and a bearing on said heel plate.

6. In a trolley, the combination with a frame and an axle secured thereto and extending laterally therefrom, of a trolley wheel mounted on said axle, a roller bearing within said trolley wheel engaging said axle, retaining plates for said roller bearing on opposite sides of said wheel, one of said plates being slotted to engage a groove in said axle, and clamping bolts engaging said trolley wheel on opposite sides thereof and clamping said plates thereto.

In testimony whereof I affix my signature.

JESSE E. McBRIDE.